R. C. GIFFORD.
FRUIT GATHERER.
APPLICATION FILED MAR. 28, 1916.
1,216,106. Patented Feb. 13, 1917.
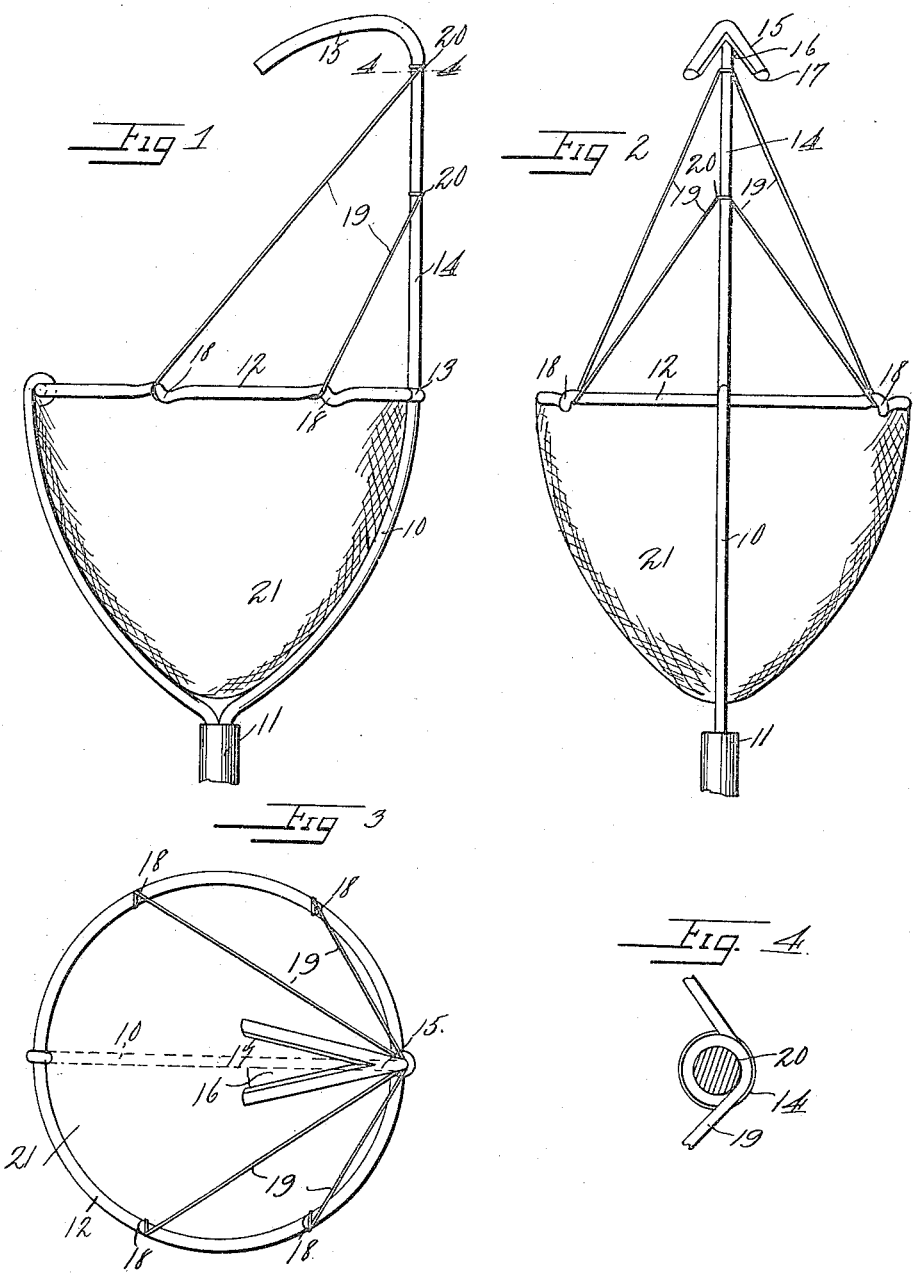
Witnesses
C. F. Ridley
H. M. Test
Inventor
R. C. Gifford
By Randles & Randles
Attorneys

UNITED STATES PATENT OFFICE.

RUTH C. GIFFORD, OF NORTH EAST, MARYLAND.

FRUIT-GATHERER.

1,216,106.

Specification of Letters Patent.

Patented Feb. 13, 1917.

Application filed March 28, 1916. Serial No. 87,355.

*To all whom it may concern:*

Be it known that I, RUTH C. GIFFORD, a citizen of the United States, residing at North East, in the county of Cecil, State of Maryland, have invented certain new and useful Improvements in Fruit-Gatherers; and I do hereby declare the following to be a full, clear, and exact description of the invention, such as will enable others skilled in the art to which it appertains to make and use the same.

This invention relates to improvements in fruit gatherers.

One object of the invention is to provide a fruit gatherer which is extremely simple in construction, composed of few parts, and which can be manufactured and sold at a low cost.

Another object is to provide a device of this character which includes a peculiar and novel bracing means, thus making the device strong and durable in use.

Other objects and advantages will be apparent from the following description when taken in connection with the accompanying drawing.

In the drawing:

Figure 1 is a side elevation of my improved fruit gatherer;

Fig. 2 is a front elevation of the same;

Fig. 3 is a top plan view;

Fig. 4 is an enlarged transverse sectional view on the line 4—4 of Fig. 1.

Referring particularly to the accompanying drawing, 10 represents a substantially V-shaped frame, the lower or apexed portion of which is suitably secured to a pole 11. One of the arms of the frame is connected to one side of a circular or elongated ring frame 12. The diametrically opposite side of the ring frame 12 is engaged around the other arm as shown at 13. This arm is extended upwardly above the ring frame 12, as shown at 14, and has its upper end bent to extend forwardly and downwardly over the ring frames, as clearly shown at 15. The end of this portion 15 is split vertically and longitudinally to provide a V-shaped opening 16, the side walls of which are sharpened to form cutting edges as shown at 17.

At four points, two on each side of the ring frame 12 there are formed the kinks or shoulders 18, and twisted around the said frame at these kinks are brace wires 19. Each pair of braces consists of a single piece of wire, the intermediate portion of which is wound a few turns around the extension 14, at different heights, and within the grooves 20.

In the operation of the device, the pole is grasped and pushed up into the fruit tree so that the stem of a piece of fruit will pass into the V-shaped opening 16 and be severed by the cutting edges 17. The fruit will drop down through the ring frame 12 and into the bag 21 which is secured to the two frames 10 and 12. The braces 19 effectively hold the extension 14 from any serious bending or possible breaking when downward pressure is exerted on the stem of a piece of fruit. It will readily be seen, upon inspection of the drawing, that this tendency to bend would be in a direction away from the frame 12 and that these braces 19 will resist this tendency by exerting a pull in the opposite direction.

What is claimed is:

A fruit gatherer comprising a V-shaped frame, a pole connected to and supporting the frame, a horizontal ring secured to the arms of the frame, one of said arms extending above the ring and provided with circumferential grooves, the said extension arm having its upper end inclined downwardly over the ring, said inclined portion being bifurcated to provide a V-shaped opening for the reception of fruit stems and having the opposed walls thereof sharpened, said ring being bent in a plurality of points to form shoulders, braces consisting of single lengths of wire having their intermediate portions wound around the circumferential grooves in the extension of the arm of the V-shaped frame and their ends secured to the said shoulders on opposite sides of the said ring to prevent slipping of the said brace wires, and a receiving bag mounted in the V-shaped frame and secured to the horizontal ring.

In testimony whereof, I affix my signature, in the presence of two witnesses.

RUTH C. GIFFORD.

Witnesses:
E. KIRK BROWN,
R. Y. GIFFORD.

Copies of this patent may be obtained for five cents each, by addressing the "Commissioner of Patents, Washington, D. C."